(12) United States Patent
Zhang

(10) Patent No.: US 10,659,516 B2
(45) Date of Patent: May 19, 2020

(54) DATA CACHING AND RESOURCE REQUEST RESPONSE

(71) Applicant: International Business Machines Corporation, Armonk, NY (US)

(72) Inventor: Ling Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/159,937

(22) Filed: Oct. 15, 2018

(65) Prior Publication Data

US 2019/0052693 A1 Feb. 14, 2019

Related U.S. Application Data

(63) Continuation of application No. 14/725,455, filed on May 29, 2015, now Pat. No. 10,104,151.

(30) Foreign Application Priority Data

Jun. 27, 2014 (CN) .......................... 2014 1 0301784

(51) Int. Cl.
*G06F 15/16* (2006.01)
*H04L 29/08* (2006.01)
*G06F 12/0866* (2016.01)

(52) U.S. Cl.
CPC .......... *H04L 67/02* (2013.01); *G06F 12/0866* (2013.01); *H04L 67/1097* (2013.01); *H04L 67/2857* (2013.01); *G06F 2212/452* (2013.01)

(58) Field of Classification Search
CPC ........... G06F 12/0866; G06F 2212/452; H04L 67/02; H04L 67/1097; H04L 67/2857
See application file for complete search history.

(56) References Cited

U.S. PATENT DOCUMENTS 6,832,222 B1 12/2004 Zimowski
7,188,240 B1 3/2007 Berstis et al.
(Continued)

FOREIGN PATENT DOCUMENTS

| CN | 102484647 A | 5/2012 |
| CN | 102713865 A | 10/2012 |
| CN | 102981979 A | 3/2013 |

OTHER PUBLICATIONS

Intellectual Property Office of the PRC Notification of Office Action, dated Mar. 8, 2019, regarding Application No. 201410301784. 1, 7 pages. English Translation Unavailable.

(Continued)

*Primary Examiner* — Normin Abedin
(74) *Attorney, Agent, or Firm* — Yee & Associates, P.C.

(57) ABSTRACT

A data caching method and device, and a resource request response method and device. The data caching method comprise: receiving a resource request for group content belonging to a specific user group, the resource request being sent from a user terminal to an application server by a user; checking if a mapping between the group content and a group caching ID for identifying the user group and a mapping between the user and the group caching ID have been established in the caching server; and returning the group content cached in the caching server to the user terminal in responses to the mapping between the group content and the group caching ID and the mapping between the user and the group caching ID having been established in the caching server.

8 Claims, 5 Drawing Sheets

(56) References Cited

U.S. PATENT DOCUMENTS

| | | | |
|---|---|---|---|
| 8,091,124 B2 | 1/2012 | Almog et al. | |
| 8,307,452 B2 | 11/2012 | Jancula et al. | |
| 8,402,554 B2 | 3/2013 | Thomas et al. | |
| 2007/0171921 A1 | 7/2007 | Wookey et al. | |
| 2013/0007188 A1* | 1/2013 | Lowery | H04L 67/1063 |
| | | | 709/213 |
| 2013/0311578 A1 | 11/2013 | Yanagihara | |

OTHER PUBLICATIONS

Blundo et al., "A Lightweight Approach to Authenticated Web Caching," Proceedings of the 2005 Symposium on Applications and the Internet(SAINT'05), Jan. 2005, pp. 157-163.

Intellectual Property Office of the PRC Notification of Office Action, dated Jan. 29, 2018, regarding Application No. 201410301784. 1, 7 pages. English Translation Unavailable.

* cited by examiner

DATA CACHING AND RESOURCE REQUEST RESPONSE

CROSS-REFERENCE TO RELATED APPLICATION(S)

This application is a continuation of U.S. patent application Ser. No. 14/725,455, filing date May 29, 2015, which claims the benefit of priority to Chinese Patent Application No. 201410301784.1, filed Jun. 27, 2014, the entire contents of which are incorporated herein by reference.

BACKGROUND

The present invention relates to data caching, more specifically, to a data caching method and device and a resource request response method and device.

Data caching is the key to improve response time of massive data processing applications such as social network, cooperative network applications and so on. These applications produce two kinds of data, public data and private data. There are good solutions for public data caching. The most common ways for public data caching are: 1) setting up a public cacheable HTTP header in an HTTP (Hyper Text Transfer Protocol) response header for public resources such as public web pages, public files, etc., a caching server (e.g., a WebSphere Edge server from IBM) caching related content locally, and if the requested content is in its cache, the caching server returning the related content back to the user instead of sending a request to an application server; 2) moving public cachable content to a regional caching server (Content distribution Network or CDN) and routing the user request to the nearest caching server to get the best information. For private data, the most common approaches are: 1) not to allow caching; 2) setting up a private cachable header in the HTTP response, which means that the content can be cached by an end-user browser but not a caching server, so that the user privacy is guaranteed.

However, there is a third type of data in network applications. The access to such data is limited to only members of a specific user-group, and users out of the user-group are not permitted to access such data. For example, the user-group may be an online user group, a community, a team or the like, and the corresponding data may be Blogs, discussion on a forum, Wikipedia pages, files or the like. Public caching cannot be applied to this kind of data, since it may leak the data to the users out of the group. Meanwhile, processing the data by the private caching header cannot achieve a good performance due to that the cached data cannot be shared between members of the group; therefore it cannot further improve the systematic performance, especially for the groups having thousands of users.

SUMMARY

An object of the invention is to provide a solution that allows cached group content (i.e., the above third type of data) to be shared between valid members of a group, so as to reduce response time for user request and reduce the load of the application server.

According to one aspect of the invention, a data caching method for a caching server is provided, comprising: receiving a resource request for group content belonging to a specific user group, the resource request being sent from a user terminal to an application server by a user; checking if a mapping between the group content and a group caching ID for identifying the user group and a mapping between the user and the group caching ID have been established in the caching server; and returning the group content cached in the caching server to the user terminal in responses to the mapping between the group content and the group caching ID and the mapping between the user and the group caching ID having been established in the caching server.

In the aspect of the invention, optionally, the data caching method further comprises: in responses to at least one of the mapping between the group content and the group caching ID and the mapping between the user and the group caching ID having not been established in the caching server, forwarding the resource request to the application server, receiving return data from the application server, and in response to the return data containing a return code indicating that the user is a valid user of the user group and the group caching ID, establishing the mapping between the user and the group caching ID in a case of the mapping between the user and the group caching ID having not been established, establishing the mapping between the group content and the group caching ID in a case of the mapping between the group content and the group caching ID having not been established, caching the group content contained in the return data, and returning the group content to the user terminal.

According to another aspect of the invention, a data caching device for a caching server is provided, comprising: a receiving module configured to receive a resource request for group content belonging to a specific user group, the resource request being sent from a user terminal to an application server by a user; a checking module configured to check if a mapping between the group content and a group caching ID for identifying the user group and a mapping between the user and the group caching ID have been established in the caching server; and a content return module configured to return the group content cached in the caching server to the user terminal in responses to the mapping between the group content and the group caching ID and the mapping between the user and the group caching ID having been established in the caching server.

In the another aspect of the invention, optionally, the data caching device further comprises: a cache establishing module configured to, in responses to at least one of the mapping between the group content and the group caching ID and the mapping between the user and the group caching ID having not been established in the caching server, forward the resource request to the application server, receive return data from the application server, and in response to the return data containing a return code indicating that the user is a valid user of the user group and the group caching ID, establish the mapping between the user and the group caching ID in a case of the mapping between the user and the group caching ID having not been established, establish the mapping between the group content and the group caching ID in a case of the mapping between the group content and the group caching ID having not been established, cache the group content contained in the return data, and return the group content to the user terminal.

According to still another aspect of the invention, a resource request response method for an application server is provided, comprising: receiving a resource request for group content belonging to a specific user group, the resource request being sent by a user and forwarded by a caching server; verifying if the user is a valid user of the user group; and in response to the user being a valid user of the user group, returning to the caching server return data containing a return code indicating that the user is a valid user of the user group, a group caching ID identifying the user group and the group content, for the caching server to establish a mapping between the user and the group caching ID and a mapping between the group content and the group caching ID and cache the group content.

According to still another aspect of the invention, a resource request response device for an application server is provided, comprising: a receiving module configured to receive a resource request for group content belonging to a specific user group, the resource request being sent by a user and forwarded by a caching server; a verification module configured to verify if the user is a valid user of the user group; and a data return module configured to return to the caching server a return data containing a return code indicating that the user is a valid user of the user group, a group caching ID identifying the user group and the group content, for the caching server to establish a mapping between the user and the group caching ID and a mapping between the group content and the group caching ID and cache the group content.

According to still another aspect of the invention, a computer program product is provided, the computer program product comprising a storage medium readable by a computer and storing instructions. The instructions can be executed by the computer to perform steps of the data caching method for a caching server provided by the above aspects of the invention, or steps of the resource request response method of the application server provided by the above aspects.

According to the invention, it is possible to cache group content belonging to a specific user group securely in a caching server, and the cached group content can be shared among all valid users of the user group without being captured by users out of the user group, so that the response time for the user requesting the group content and the work load of an application server are reduced on one hand and the group content is secured on the other hand.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
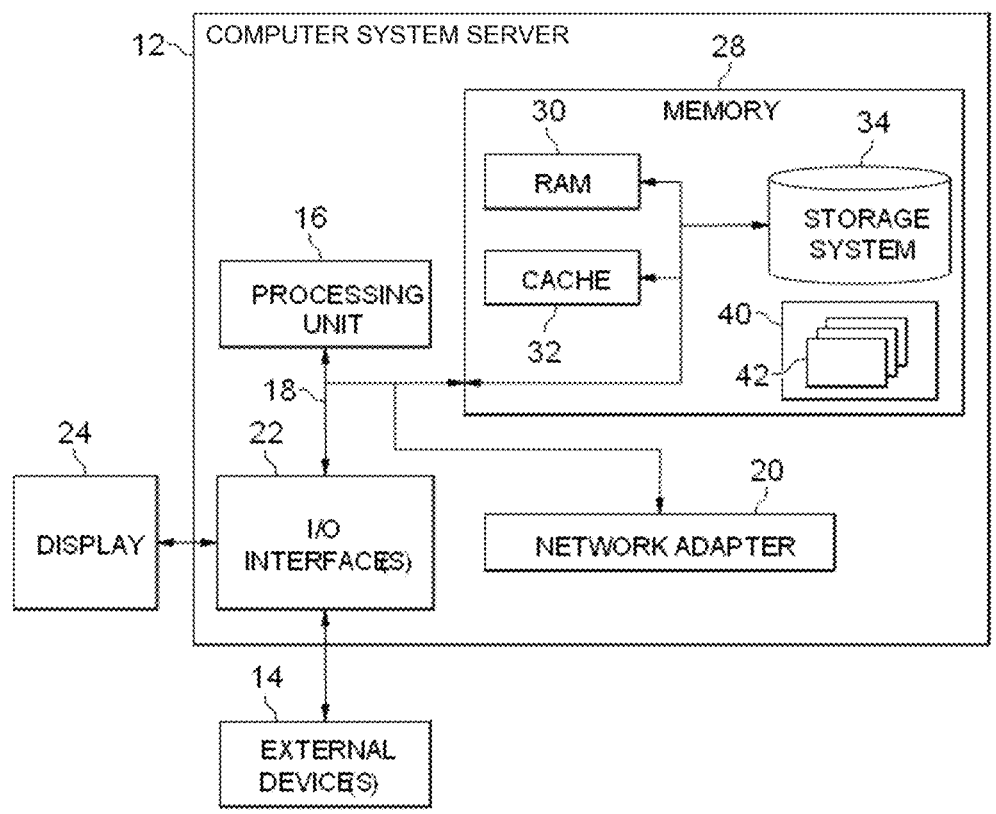
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
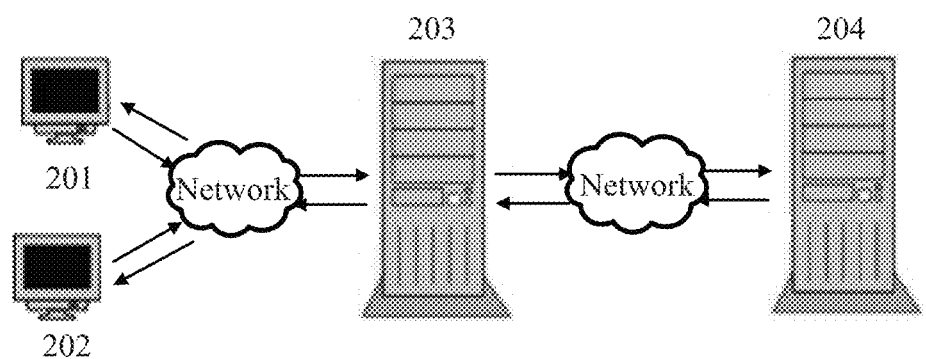
FIG. 2 shows a schematic diagram of an exemplary network system according to an embodiment of the invention.

FIG. 2 shows a schematic diagram of an exemplary network system according to an embodiment of the invention. The network system illustratively includes two user terminals 201 and 202, one caching server 203 and one application server 204. It should be noted that, the numbers of the user terminals, the caching server and the application server herein are merely illustrative, and the network system may include any number of user terminals, caching servers and application servers. Herein, the user terminal refers to any terminal device that is capable of acquiring resources from the network, such as personal computer, a tablet computer, a mobile phone, a smart phone or the like. The application server refers to any server providing resources on the network, such as web server, online game server, online community server, web database server or the like. The caching server refers to any server that is logically located between the user terminal and the application server, and is used to cache data from the application server and to send the data being requested directly to the user terminal if the relevant data is stored thereon. The caching server sometimes is also referred to as a proxy, such as the WebSphere Edge server from IBM. Usually, the caching server is geographically closer to the user terminal than the application server; therefore it is possible to reduce the response time for a user to request data by caching data in the caching server. The caching server and the application server herein may both employ the structure of the above-described exemplary computer system/server 12. In the network system as shown in FIG. 2, a resource request to the application server 204 from the user terminal 201 or 202 is first received by the caching server 203, which determines whether to forward the resource request to the application server 204 or to directly respond to the request for resources based on predetermined conditions. Besides, the caching server 203 can cache the data returned from the application server 204, and forward the data to the user terminals 201 or 202.

Figure 3:
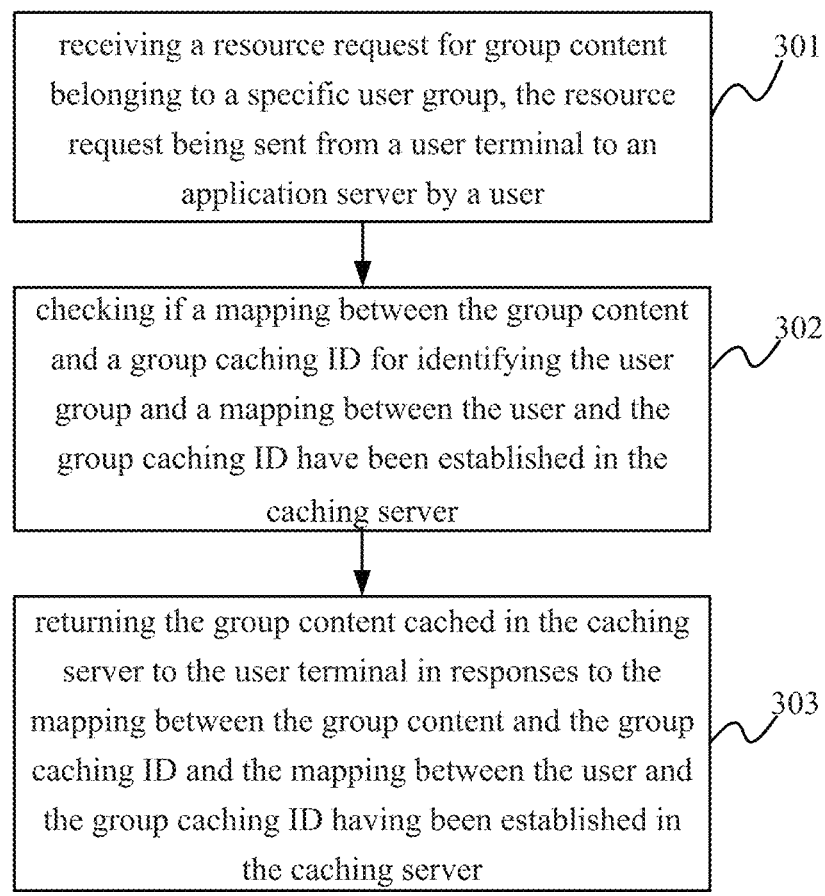
FIG. 3 shows a flowchart of a data caching method for a caching server according to an embodiment of the invention.

FIG. 3 shows the flowchart of a data caching method for a caching server according to an embodiment of the invention. Firstly, in Step 301, the caching server receives a resource request for group content belonging to a specific user group, the resource request being sent from the user terminal to the application server by the user. Herein, the group content refers to the content that is only accessible to valid users of the specific user group and not accessible to users out of the user group, such as blog, forum discussion, Wikipedia pages, files or the like. The user can send the resource request for the group content to the application server by means of a user token indicating his/her valid identity and the network address of the group content (such as Uniform Resource Locator, URL). Usually, the user can send the resource request from the user terminal to the application server by a network protocol such as HTTP protocol. For example, typically, the user may send the resource request to the application server by entering the network address of the group content into the address box of a network browser in the user terminal. In addition, a user is usually required to log on the application server with his/her user name and his/her password, so as to verify whether the specific user is a valid user or not, i.e., whether the specific user has the permission to access specific content of the application server (such as private content or group content) or not. After the application server has verified the user to be a valid user (that is, the user has logged on successfully), a user token will be issued to the user terminal for the user to indicate his/her valid identity when he/she requests resources from the application server. The user token can typically stored in cookies of the user's browser. For example, in the WebSphere Application Server from IBM, the user token is LtpaToken. However, it should be noted that, in the present disclosure, the valid identity of the user is not limited to be indicated by the user token, but also by other secure methods, for example, by using a combined string of username and password.

In Step 302, the caching server checks if a mapping between the group content and a group caching ID for identifying the user group and a mapping between the user and the group caching ID have been established in the caching server. In the invention, when the caching server receives the resource request from the user terminal, it has to determine whether to return the cached content to the user terminal directly or to forward the resource request to the backend application server for processing. During the determination, the caching server needs to verify two aspects, that is, if the group content being requested has been cached in the caching server and if the user is a valid user of the user group corresponding to the group content being requested. According to the invention, the caching server verifies the two aspects by establishing two mappings, i.e., the mapping between the group content and the group caching ID for identifying the user group and the mapping between the user and the group caching ID. In other words, if the caching server has established a mapping between a specific group content and a group caching ID indicating the specific user group, then the group content belonging to the user group has been cached in the caching server; if the caching server has established a mapping between a specific user and the group caching ID, then the user is a valid user of the user group. From the above, if both mappings have been established in the caching server, then the group content being requested has been cached in the caching server, and the user is permitted to access the group content. As an example, the mapping between the group content and the group caching ID can be implemented by a mapping between the Uniform Resource Locator (URL) of the group content and the group caching ID; the mapping between the user and the group caching ID can be implemented by a mapping between the user token of the user and the group caching ID. Since the user token is generated by the application server, it is difficult for illegal users to fake valid identities, which ensures the security of the data. In addition, the above mapping can be implemented by the form of a mapping table, in which each mapping is one item of the mapping table. For example, Table 1 and Table 2 below illustratively show a group content/group caching ID mapping table and a user/group caching ID mapping table respectively, wherein the group content is represented by URL and the user is represented by the user token. It should be noted that, the group caching ID can be a combination of any characters, as long as it can uniquely identify the user group in the caching server.

TABLE 1

| group content/group caching ID mapping table | |
|---|---|
| URL | Group caching ID |
| URL1 | 111-222-333-444 |
| URL2 | 555-666-777-888 |

TABLE 2

| user/group caching ID mapping table | |
|---|---|
| User Token | Group caching ID |
| 01234 | 111-222-333-444 |
| 56789 | 111-222-333-444 |

If it is determined that the mapping between the group content and the group caching ID and the mapping between the user and the group caching ID have been established in the caching server in Step 302, the process goes to Step 303. That is, in Step 303, the caching server returns the group content cached in the caching server to the user terminal in response to the mapping between the group content and the group caching ID and the mapping between the user and the group caching ID having been established in the caching server. As discussed above, when both mappings have been established in the caching server, it indicates that the group content being requested by the user has been cached in the caching server, and the user is permitted to access the group content. Therefore, the caching server directly returns the group content cached therein to the user terminal instead of forwarding the resource request to the backend application server, so that the response time of the request can be reduced and the work load of the application server can be reduced. For example, assuming the mappings in the above Table 1 and Table 2 have been established in the caching server, if the user token of the user is 01234 or 56789 and the URL of the group content being requested is URL1, the caching server can directly return the group content corresponding to URL1 cached therein to the user without forwarding the resource request to the backend application server since the mapping between URL1 and the group caching ID 111-222-333-444 and the mapping between the group caching ID 111-222-333-444 and the user token 01234 or 56789 have been established.

According to the embodiment of the invention, the group content cached in the caching server can be shared only among valid users of the group, without being captured by any user out of the group. That is, the group content belonging to a specific user group can be securely cached in the caching server, so as to guarantee the security of the group content. In addition, since validity of the user and the existence of a cached copy of the group content can be determined by relatively simple logics in the caching server, without forwarding the resource request of the user to the backend application server all the times to verify the validity of the user and request the related group content, the response time of the user request can be reduced and the work load of the application server can be reduced.

It should be noted that implementations of establishing the above two mappings in the caching server and caching the group content can adopt various ways depending on different applications. For example, it is possible to acquire information for establishing the above mappings from the application server and related group content when the caching server is being initialized or updated, or when the user is accessing the application server via the caching server, or the like. The invention is not limited by the implementations mentioned above. In addition, in the embodiments of the invention, when at least one of the above two mappings is not established, the caching server can forward the resource request of the user to the application server. The specific processing manners of the application server can be various depending on different applications. For example, it is possible to conventionally verify validity of the user and return the group content requested, or to return more information to implement more functions (For example, the operations described with reference to FIG. 4 and FIG. 5 below). The invention is not limited by the specific processing manners of the application server.

Figure 4:
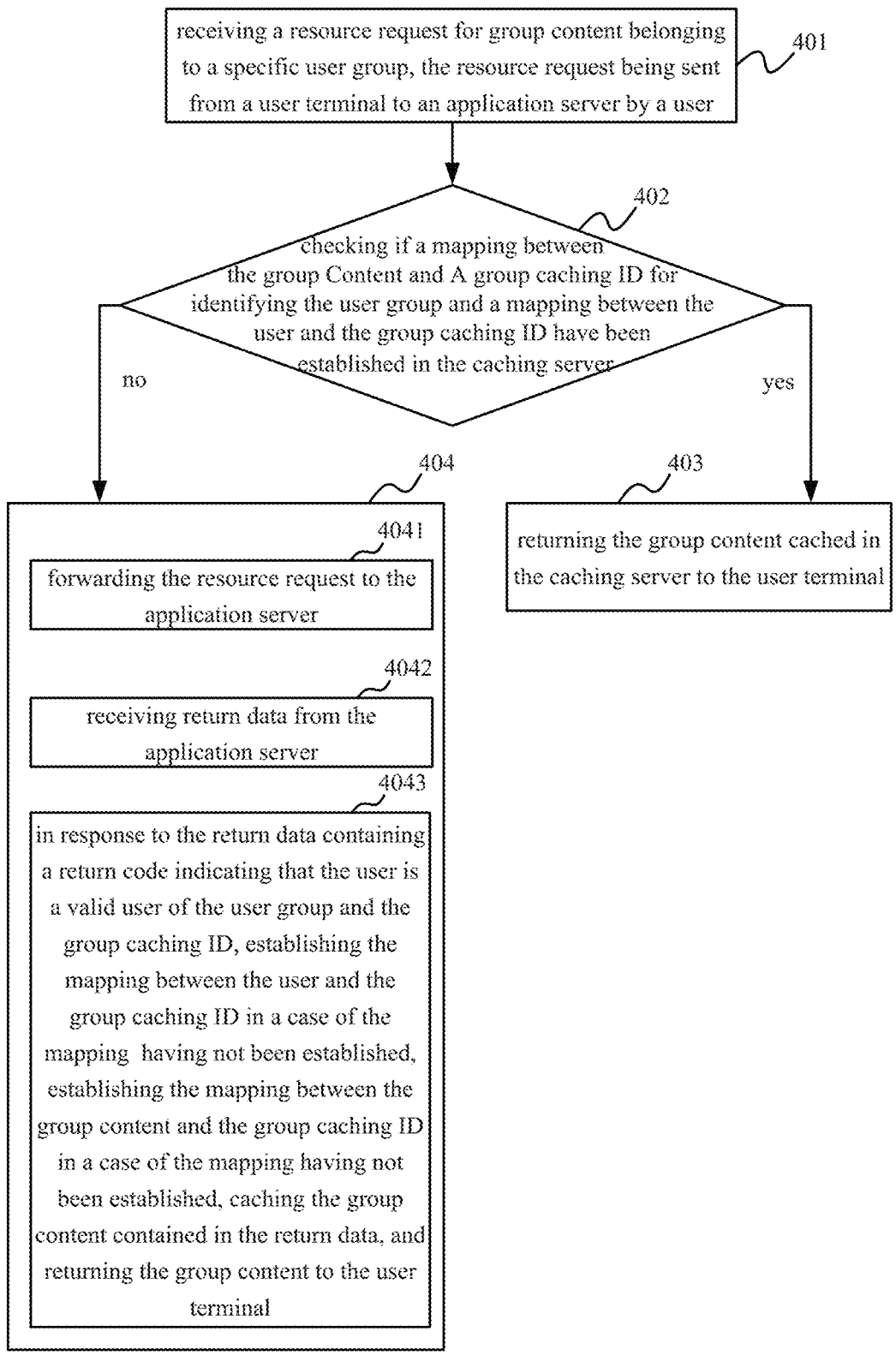
FIG. 4 shows a flowchart of a data caching method for a caching server according to another embodiment of the invention.

FIG. 4 shows a flowchart of a data caching method for a caching server according to another embodiment of the invention. In the embodiment, one implementation of establishing the mapping between the group content and the group caching ID and the mapping between the user and the group caching ID is illustratively provided. In the embodiment, Step 401, 402 and 403 corresponds to Step 301, 302 and 303 in FIG. 3 respectively, and the detailed descriptions about these steps above are the same.

In Step 401, the caching server receives the resource request for group content belonging to a specific user group, the resource request being sent from the user terminal to the application server by the user. In Step 402, the caching server checks if the mapping between the group content and the group caching ID for identifying the user group and the mapping between the user and the group caching ID have been established in the caching server. In Step 403, the group content cached in the caching server is returned to the user terminal in response to the mapping between the group content and the group caching ID and the mapping between the user and the group caching ID having been established in the caching server.

However, if it is determined in Step 402 that at least one of the mapping between the group content and the group caching ID and the mapping between the user and the group caching ID is not established in the caching server, the process goes to Step 404. Step 404 is a step for establishing above mappings in the caching server and caching the group content. The above has described the meanings of the mapping between the group content and the group caching ID and the mapping between the user and the group caching ID and the operations of the caching server when both of them have been established. Step 404 describes the operations of the caching server when above mappings are not established and how both of them are established by way of example. Step 404 includes sub-steps 4041 to 4043.

In the sub-step 4041, the caching server forwards the resource request to the application server. As illustrated above, when the mapping between the group content and the group caching ID and the mapping between the user and the group caching ID have not been established, it is indicated that the group content is not cached in the caching server or the user is not proved to be accessible to the group content. In this case, the caching server forwards the resource request to the backend application server. In this way, the caching server forwards the request to the application server directly without processing complicated identity verification, so that the complexity of the caching server is reduced.

Figure 5:
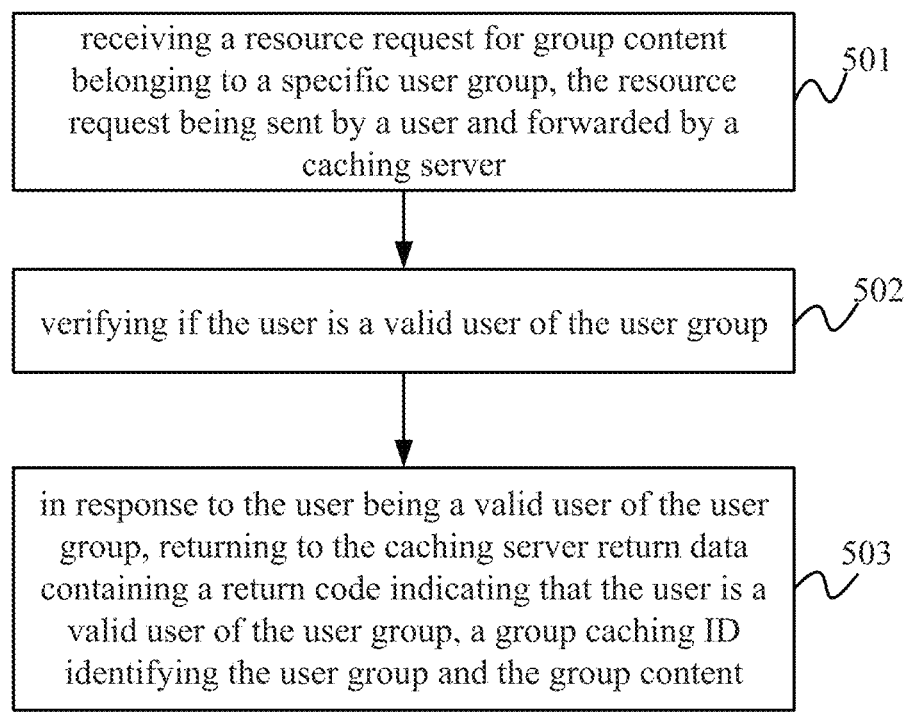
FIG. 5 shows a flowchart of a resource request response method for an application server according to an embodiment of the invention.

After the application server has received the resource request forwarded by the caching server, the validity of the user will be verified and related data will be returned. FIG. 5 shows a flowchart of a resource request response method for an application server according to an embodiment of the invention. In Step 501, the application server receives the resource request for group content belonging to a specific user group, the resource request being sent by the user from the user terminal and forwarded by the caching server. In Step 502, the application server verifies if the user is a valid user of the user group. For example, the application server verifies if the user token in the request is valid, or if the user name and the password input by the user are matched. If the user is determined to be a valid user of the user group in Step 502, the application server returns return data to the caching server, the return data containing a return code indicating the user is a valid user of the user group, a group caching ID identifying the user group, and the group content, for the caching server to establish the mapping between the group content and the group caching ID and the mapping between the user and the group caching ID and cache the group content. In other words, when the verification in Step 502 succeeds, the application server will return to the caching server related return data, containing: the return code indicating the user is a valid user, for example, a return code 200 of HTTP; the group caching ID identifying the user group; and the group content being requested. The group caching ID can be, for example, returned in a HTTP header. For instance, the group caching ID may be placed in the "cache" header of HTTP. Through the return code and the group caching ID, the caching server can be aware of the user being a valid user of the user group corresponding to the group caching ID, and can establish a corresponding mapping and cache the returned group data. On the contrary, if the user ID verification has failed, the application server may return a return code indicating that no permission is granted (for example, return code 403 of HTTP) or require the user to log on (for example, return code 401 of HTTP). The invention does not limit the processing method when the user ID verification fails, and may adopt any method in the prior art or developed in the future.

Retuning to FIG. 4 now, in the sub-step 4042, the caching server receives the return data from the application server. In the sub-step 4043, in response to the return data containing a return code indicating that the user is a valid user of the user group and the group caching ID (i.e., indicating the user is a valid user of the user group), the caching server establishes the mapping between the user and the group caching ID in a case of the mapping between the user and the group caching ID having not been established, establishes the mapping between the group content and the group caching ID in a case of the mapping between the group content and the group caching ID having not been established, caches the group content contained in the return data, and returns the group content to the user. When the user is verified to be a valid user by the application server, it indicates that the user is accessible to the group content requested so that the caching server returns the group content to the user; meanwhile, the caching server can establish corresponding mappings and cache the group content, so that when the user requests related group content in the next time, the requested group content can be directly returned without forwarding the request to the application server. According to the return data, the caching server can establish two mappings, i.e., the mapping between the user and the group caching ID, and the mapping between the group content and the group caching ID. When the user requests the group content via the caching server again, by using the mapping between the user and the group caching ID, the caching server can verify the validity of the user by itself, i.e., directly verify if the mapping between the user and the group caching ID has been established. When the group content is requested again, with the mapping between the group content and the group caching ID, the group content can be returned to the requesting user directly. It should be noted that, since the request will be forwarded to the application server if either of both mappings is not established, it is possible that one of the mappings has been established when the return data is received from the application server. In this case, the mapping that has been established will not be established again. In addition, as discussed above, the establishment of the mapping between the group content and the group caching ID can be implemented by the mapping between the URL of the group content and the group caching ID; the establishment of the mapping between the user and the group caching ID can be implemented by the mapping between the user token of the user and the group caching ID, wherein the URL of the group content and the user token can be extracted from the resource request of the user, the group caching ID can be extracted from the return data from the application server. According to the invention, when establishing a mapping between specific group content and the group caching ID, the caching server will cache the group content. In other words, as long as the mapping between the specific group content and the group caching ID exists in the caching server, the group content must have been cached in the caching server. In particular, when the caching server receives a resource request for specific group content by a specific user, the group content may have been cached, i.e., the mapping between the group content and the group caching ID exists; however, the mapping between the user and the group caching ID does not exist, i.e., the caching server cannot verify if the user is a valid user corresponding to the user group. In this case, according to the invention, the caching server also need to forward corresponding request to the application server, the application server verifies the ID of the user, and returns the corresponding group caching ID and the group content. However, since the group content has been cached in this case, when the caching server receives the group content from the application server once again, the caching server may update the group content. In other words, in this case, "caching the group content included in the return data" in the sub-step 4043 means "the cached group content is updated by the group content included in the return data".

Based on the above description, it can be seen that the caching server according to the invention can simply verify by itself if some user belongs to valid users of a corresponding user group by establishing the mapping between the user and the group caching ID (without calling back the application service), and verify if the group content belonging to the corresponding user group has been cached in the caching server by establishing the mapping between the group content and the group caching ID, so that when the user requesting the group content and the group content being requested can be connected by the above two mappings established in the caching server, the caching server can return the group content to the user directly without forwarding the request to the backend application server. In addition, according to the embodiment, since the above two mapping are only established when the caching server receives information returned from the application indicating the user who is requesting is a valid user of the corresponding user group, users who do not belong to the valid users of the corresponding user group cannot acquire the cached group content, so that the group content is secured.

To sum up, according to the invention, the group content belonging to a specific user group can be cached in the caching server safely. The cached group content can be shared among all valid users of the user group, but cannot be acquired by users out of the user group. Therefore, the response time for users to request the group content and the work load of the application server are reduced, while the security of the group content is ensured.

Figure 6:
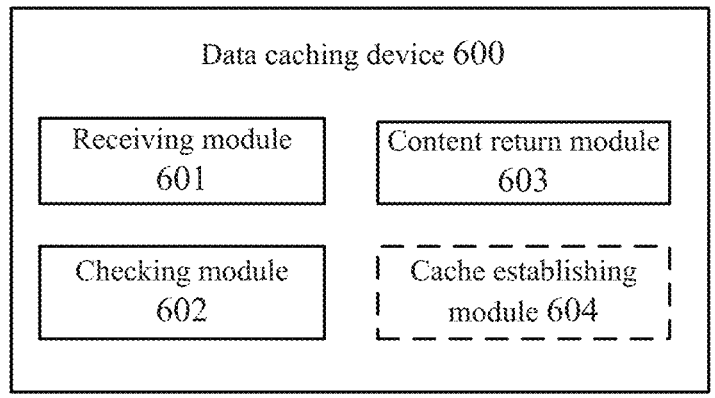
FIG. 6 shows a structural block diagram of a data caching device for a caching server according to an embodiment of the invention.

FIG. 6 shows a structural block diagram of a data caching device 600 for a caching server according to an embodiment of the invention. The data caching device 600 includes a receiving module 601, a checking module 602, and a content return module 603. And, optionally, the data caching device 600 can further include a cache establishing module 604. The receiving module 601 is configured to receive a resource request for group content belonging to a specific user group, the resource request being sent from a user terminal to an application server by a user. The checking module 602 is configured to check if a mapping between the group content and a group caching ID for identifying the user group and a mapping between the user and the group caching ID have been established in the caching server. The content return module 603 is configured to return the group content cached in the caching server to the user terminal in responses to the mapping between the group content and the group caching ID and the mapping between the user and the group caching ID having been established in the caching server. The cache establishing module 604 is configured to, in responses to at least one of the mapping between the group content and the group caching ID and the mapping between the user and the group caching ID having not been established in the caching server, forward the resource request to the application server, receive return data from the application server, and in response to the return data containing a return code indicating that the user is a valid user of the user group and the group caching ID, establish the mapping between the user and the group caching ID in a case of the mapping between the user and the group caching ID having not been established, establish the mapping between the group content and the group caching ID in a case of the mapping between the group content and the group caching ID having not been established, cache the group content contained in the return data, and return the group content to the user terminal.

Details of the caching methods described with reference to FIG. 3 and FIG. 4 above apply to the data caching device 600 as well, the detailed description of which will be omitted. According to one embodiment, the receiving module 601, the checking module 602, the content return module 603 and the cache establishing module 604 may be implemented by the way of combining the computer similar to the computer system/server 12 described in FIG. 1 with software. And the above-described modules are not necessary to be separated as different modules physically, but all or parts of the functions may be implemented as one module.

Figure 7:
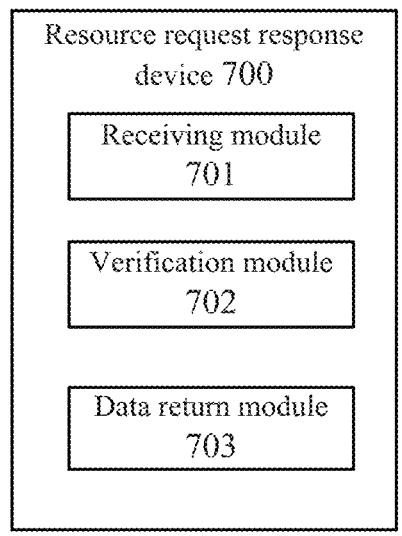
FIG. 7 shows a structural block diagram of a resource request response device for an application server according to an embodiment of the invention.

FIG. 7 shows a structural block diagram of a resource request response device of an application server according to an embodiment of the invention. The resource request response device 700 includes a receiving module 701, a verification module 702, and a data return module 703. The receiving module 701 is configured to receive a resource request for group content belonging to a specific user group, the resource request being sent by a user and forwarded by a caching server. The verification module 702 is configured to verify if the user is a valid user of the user group. The data return module 703 is configured to return to the caching server a return data containing a return code indicating that the user is a valid user of the user group, a group caching ID identifying the user group and the group content, for the caching server to establish a mapping between the user and the group caching ID and a mapping between the group content and the group caching ID and cache the group content.

Details of the resource request response method described with reference to FIG. 5 above apply to the resource request response device 700 as well, the detailed description of which will be omitted herein. According to one embodiment, the receiving module 701, the verification module 702 and the data return module 703 may implemented by the way of combining the computer similar to the computer system/server 12 described in FIG. 1 with software. And the above-described modules are not necessary to be separated as different modules physically, but all or parts of the functions may be implemented as one module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A resource request response method for an application server, comprising:
   receiving a resource request for group content belonging to a specific user group, the resource request being sent by a user and forwarded by a caching server;
   verifying if the user is a valid user of the user group; and
   in response to the user being a valid user of the user group, returning to the caching server return data containing a return code indicating that the user is a valid user of the user group, and a group caching ID identifying the user group and the group content, for the caching server to establish a mapping between the user and the group caching ID and a mapping between the group content and the group caching ID and cache the group content.

2. The resource request response method of claim 1, wherein the group caching ID uniquely identifies the user group in the caching server.

3. A resource request response device for an application server, comprising:
   a receiving module configured to receive a resource request for group content belonging to a specific user group, the resource request being sent by a user and forwarded by a caching server;
   a verification module configured to verify if the user is a valid user of the user group; and
   a data return module configured to return to the caching server a return data containing a return code indicating that the user is a valid user of the user group, and a group caching ID identifying the user group and the group content, for the caching server to establish a mapping between the user and the group caching ID and a mapping between the group content and the group caching ID and cache the group content.

4. The resource request response device of claim 3, wherein the group caching ID uniquely identifies the user group in the caching server.

5. A computer program product comprising a non-tangible storage medium readable by a computer and storing instructions that are configured to perform the steps of claim 1 when executed by the computer.

6. A method comprising:
setting up an online community, including a plurality of community members and a plurality of community computing devices, with each community computing device being associated with at least one community member, and with membership in the online community being based on a personal and/or professional relationship between the community members;
caching web content data in a community cache;
selectively providing access, over a communication network, to the web content data in the group cache only to community computing devices, wherein the community cache is located in a server cache computing device, and machine logic for selectively providing access to the web content data is located in the server cache computing device;
assigning a community caching identifier to the online community; and
providing a user token data set to each community computing device, with the user token data set including information indicative of the community caching identifier;
wherein the selective provision of access only to community computing devices includes:
receiving, over the communication network, the user token data set from a first community computing device of the plurality of community computing devices, and responsive to receipt of the user token data set from the first community computing device, allowing the first community computing device to access at least a portion of the cached web content data in the community cache, wherein the community cache is located in a server cache computing device, and machine logic for selectively providing access to the web content data is located in the server cache computing device.

7. The method of claim 6 wherein the community cache and the selective provision of access to web content cached in the community cache provides secure caching of private web content for an online community to improve data loading performance.

8. A method comprising:
assigning group content as belonging to a specific user group including a plurality of users that includes a first user;
caching the group content in a caching server;
providing mapping data including information indicative of a mapping between: (i) each respective user of the plurality of users of the specific user group, and (ii) a group caching ID;
receiving, by an application server and from the first user, a resource request for the group content, with the request including information indicative of the group caching ID;
determining, by the application server, that the mapping data includes a mapping between the group caching ID and the first user; and
responsive to the determination that the mapping data includes a mapping between the group caching ID and the first user, returning, by the application server, the group content cached in the caching server to a device operated by the first user.

\* \* \* \* \*